| DRIVE RANGE | DRIVE ESTABLISHING DEVICE ENGAGEMENT | | | | | | | | | HYDROSTATIC PROPULSION OPERATION | HYDROSTATIC STEER OPERATION |
|---|---|---|---|---|---|---|---|---|---|---|---|
| | 49 | 83 | 54 | 89 | 59 | 62 | 120 | 119 | 116 | | |
| 1 | X | X | | | | | | | X | 16 & 18 | 16 & 18 |
| 2 | | | X | X | | | | | X | 16 & 18 | 16 & 18 |
| 2 ALT. | | | | X | | | | X | X | 18 | 16 |
| 3 | | | | | X | | | X | X | 18 | 16 |
| 4 | | | | | | X | X | X | | 18 | 16 |

INVENTORS.
James C. Polak, &
James J. Mooney, Jr.
BY Ronald L. Phillips
ATTORNEY United States Patent Office 3,532,006
Patented Oct. 6, 1970

3,532,006
SELECTIVE HYDROSTATIC AND HYDRO-
MECHANICAL POWER TRAIN FOR PRO-
PULSION AND STEERING
James C. Polak and James J. Mooney, Jr., Indianapolis,
Ind., assignors to General Motors Corporation, De-
troit, Mich., a corporation of Delaware
Filed Dec. 27, 1968, Ser. No. 787,491
Int. Cl. F16h 37/06
U.S. Cl. 74—720.5                5 Claims

ABSTRACT OF THE DISCLOSURE

A power train having separate power paths to two outputs and an alternate common power path through one of the separate power paths to the two outputs with power transmittal by selective hydrostatic and hydromechanical drives with synchronous shifting and steering operation by independent output speed control with the separate power paths and by differential output speed control with the common power path.

---

Figures 1, 2:
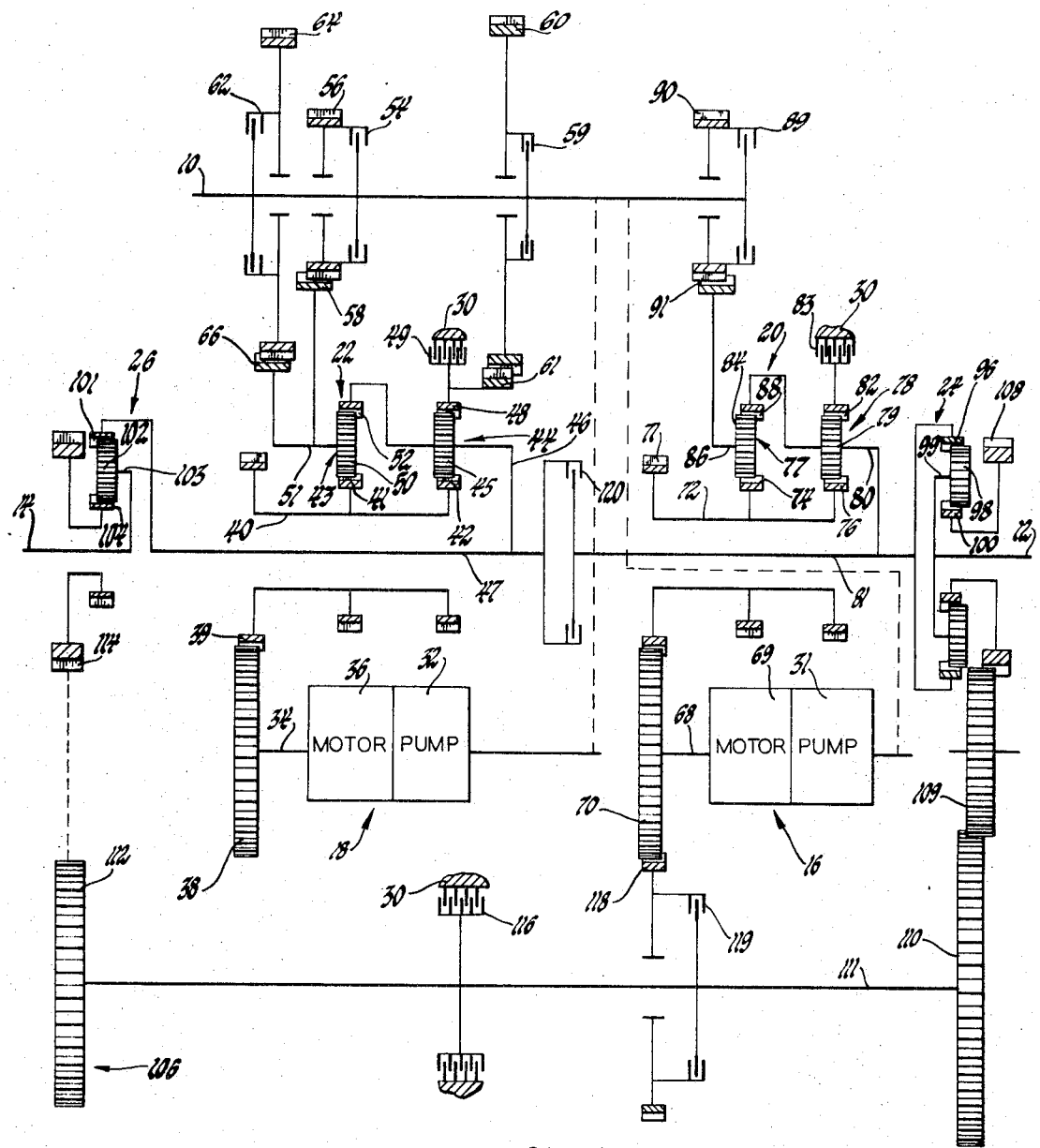

This invention relates to power trains for vehicles and more particularly to a single input, dual output tracklaying vehicle power train providing full hydrostatic drive and hydromechanical drive separately to the outputs and, alternatively, commonly to the outputs and independent output speed control and differential output speed control for steering.

The tracklaying vehicle power train according to the present invention has separate drive trains for separately drivingly connecting an input shaft to two output shafts. each of the drive trains has a variable ratio hydrostatic drive unit, a drive establishing-power combining planetary gear unit and a speed differential planetary gear unit. Each of the hydrostatic drive units is driven by the input shaft and each of the drive establishing-power combining planetary gear units is selectively driven singularly by the associated hydrostatic drive unit to provide full hydrostatic drive and simultaneously by the hydrostatic drive unit and the input shaft to provide hydromechanical drive. Each of the drive establishing-power combining planetary gear units is connected to deliver its hydrostatic and hydromechanical drives to the associated speed differential planetary gear unit. The speed differential planetary gear units are operatively connected through a gear train including a differential shaft which is braked to provide reaction in both of these units to effect a propulsion-steer drive to the associated output shaft when the power train load is high. With these propulsion-steer drives, the hydrostatic units are simultaneously, identically controlled to provide straight ahead propulsion drive and differentially controlled to provide steering. The drive establishing-power combining planetary gear unit in one of the drive trains is clutchable to the speed differential planetary gear unit in the other drive train to singularly provide propulsion drive to both of the output shafts when the power train load is sufficiently diminished. The hydrostatic drive unit in this other drive train is clutchable to both the speed differential planetary gear units to provide differential drive thereto for steering when the one drive train is providing for the propulsion drive at low power train loads.

An object of the present invention is to provide a new and improved power train.

Another object is to provide a power train having separate and, alternately, common hydrostatic drive and hydromechanical drives to two outputs with steering by speed control of the outputs in all drives.

Another object is to provide a power train having full hydrostatic drive in the lowest drive range and a plurality of higher drive ranges by hydromechanical drive with selective separate and common drive to the two outputs.

Another object is to provide a power train having drive trains to two outputs with both drive trains separately transmitting power for propulsion and steering at high power train loads and one of the drive trains transmitting full power for propulsion while the drive train transmits power for steering at low power train loads.

Another object is to provide a power train having two drive trains each providing a full hydrostatic drive and hydromechanical drive to two outputs with the drive trains separately providing drive to the outputs in at least the lowest drive range and one of the drive trains providing drive to both outputs in at least the highest drive range while the other drive train provides for steering operation.

These and other objects of the invention will be more apparent from the following description and drawing in which:

FIG. 1 diagrammatically shows a preferred embodiment of the power train according to the present invention.

FIG. 2 shows a typical schedule of power train operation.

The invention as illustrated in the preferred embodiment for use in a tracklaying vehicle power train and generally comprises a prime mover driven input shaft 10 operatively drivingly connected to a right and a left track-powering output shaft 12 and 14 by drive train means including a right and a left variable ratio hydrostatic drive unit 16 and 18, a right and a left drive establishing-power combining planetary gear unit 20 and 22, and a right and a left speed differential planetary gear unit 24 and 26. The input shaft 10 is parallel to the output shafts 12 and 14 which are axially aligned, all of these shafts being arranged to extend transverse of the vehicle. All of the power train components are suitably supported in a power train housing generally designated at 30 with the central axis of units 20, 22, 24 and 26 aligned with the output shafts and the central axis of units 16 and 18 extending parallel thereto.

Both of the variable ratio hydrostatic drive units 16 and 18 are identical and of a conventional type with the pumps having infinitely variable displacement and the motors having fixed displacement, the speed and direction of the motor output being controlled by pump displacement and from a speed of zero to maximum in either direction. The pumps 31 and 32 of the hydrostatic drive units are both connected to be driven by the input shaft 10 as diagrammatically shown such as by simple spur gear trains.

The left hydrostatic drive unit 18 provides drive to the left drive establishing-power combining unit 22 from its motor output shaft 34 which is connected to a spur gear 38. Gear 38 meshes with an annular spur gear 39 which is connected by a sleeve shaft 40 to the respective annular sun gears 41 and 42 of gear sets 43 and 44 in unit 22. In gear set 44, sun gear 42 meshes with a plurality of pinions 45 carried on a carrier 46 which is connected to this unit's main shaft 47, shaft 47 extending through sleeve shaft 40. Pinions 45 mesh with a ring gear 48 which is grounded to the power train housing 30 on engagement of a left first drive range brake 49 and, alternatively, may be mechanically driven from the input shaft 10 as described in more detail later. In gear set 43, sun gear 41 meshes with a plurality of pinions 50 carried on a carrier 51. Pinions 50 mesh with a ring gear 52 which is connected to carrier 46 of gear set 44 and is thus connected to the main shaft 47 of this unit. The carrier 51 in gear set 43 may be driven by either one of two mechanical drives from the input shaft 10 as described in more detail later.

Three selective mechanical drives to the left drive establishing-power combining unit 22 are provided, one drive being provided by a second drive range clutch 54 which is located about input shaft 10 and on engagement clutches the input shaft 10 to an annular spur gear 56. Gear 56 is located about input shaft 10 and meshes with an annular spur gear 58. Gear 58 is located about sleeve shaft 40 and connected to carrier 51 of gear set 43. Another of these mechanical drives is provided by a third drive range clutch 59 which is located about the input shaft 10 and on engagement clutches the input shaft 10 to an annular spur gear 60. Gear 60 is located about input shaft 10 and meshes with an annular spur gear 61. Gear 61 is located about carrier 46 of gear set 44 and connected to ring gear 48 of this gear set. The third mechanical drive is provided by a fourth drive range clutch 62 which is located about the input shaft 10 and on engagement clutches the input shaft 10 to a spur gear 64. Gear 64 is located about the input shaft 10 and meshes with a spur gear 66. Gear 66 is located about sleeve shaft 40 and connected to carrier 51 of gear set 43. This latter drive train through the fourth drive range clutch 62 provides a higher speed drive to carrier 51 than does the other drive train to carrier 51 through the second drive range clutch 54.

The right hydrostatic drive unit 16 provides drive to the right drive establishing-power combining unit 20 from its motor output shaft 68 which is connected to a spur gear 70. Gear 70 meshes with an annular spur gear 71 which is connected by a sleeve shaft 72 to the respective annular sun gears 74 and 76 of gear sets 77 and 78 in unit 20. In gear set 78, sun gear 76 meshes with a plurality of pinions 79 carried on a carrier 80 which is connected to this unit's main shaft 81, shaft 81 extending through sleeve shaft 72. Pinions 79 mesh with a ring gear 82 which is grounded to the power train housing 30 on engagement of a right first drive range brake 83. In gear set 77, sun gear 74 meshes with a plurality of pinions 84 carried on a carrier 86 which may be mechanically driven from the input shaft 10 as described in more detail later. Pinions 84 mesh with a ring gear 88 which is connected to carrier 80 of gear set 78 and is thus connected to the main shaft 81 of this unit.

A single mechanical drive is provided to the right drive establishing-power combining unit 20 by a right second drive range clutch 89 which is located about the input shaft 10 and on engagement clutches the input shaft 10 to an annular spur gear 90. Gear 90 is located about the input shaft 10 and meshes with an annular spur gear 91 which is located about sleeve shaft 72 and connected to carrier 86 of gear set 77.

Except for the two additional mechanical drives to the left drive establishing-power combining unit 22 provided through the third and fourth drive range clutches 59 and 62, the drive establishing-power combining units 20 and 22 and their hydrostatic and mechanical input drives are identical. Thus, they are operable to provide identical drives to their main shafts 47 and 81 for reasons which will become more apparent later.

The drives from the drive establishing-power combining units 20 and 22 are deliverable to the right and left output shafts 12 and 14 by the speed differential units 24 and 26, respectively, the latter units being identical. In the drive to the right output shaft 12, the main shaft 81 of the right unit 20 is connected at its right end to ring gear 96 of the right speed differential unit 24. Ring gear 96 meshes with a plurality of pinions 98 carried on an output carrier 99 which is connected to the inboard end of the right output shaft 12 which extends through the annular sun gear 100 of unit 24. Similarly, the main shaft 47 of the left unit 22 is connected at its left end to ring gear 101 of the left speed differential unit 26. Ring gear 101 meshes with a plurality of pinions 102 carried on an output carrier 103 which is connected to the inboard end of the left output shaft 14 which extends through the annular sun gear 104 of unit 26. Sun gear 100 which meshes with pinions 98 in the right unit 24 and sun gear 104 which meshes with pinions 102 in the left unit 26 are drivingly connected by a reaction-steer gear train 106. This gear train has at its right end an annular spur gear 108 located about the right output shaft 12 and connected to sun gear 100. Gear 108 meshes with an idler spur gear 109 which meshes with a spur gear 110 connected to the right end of a differential shaft 111. Differential shaft 111 is connected at its left end to a spur gear 112 which meshes with an annular spur gear 114 as diagrammatically shown. Gear 114 is located about the left output shaft 14 and connected to sun gear 104 of the left unit 26. The differential shaft 111 is braked on engagement of a propulsion drive brake 116 and, alternatively, may be driven by the right hydrostatic drive unit 16. The hydrostatic drive to the differential shaft 111 is provided by meshing the motor driven gear 70 with a spur gear 118 which is located about the differential shaft 111. Gear 118 is connected to the differential shaft 111 on engagement of a steer drive clutch 119 located about this shaft.

The left drive establishing-power combining unit 22 in addition to providing drive to the left output shaft 14 may be connected to provide drive to the right output shaft 12. The latter drive is provided by engagement of a propulsion drive clutch 120 which connects the right end of main shaft 47 to the left unit 22 to the left end of the main shaft 81 of the right unit 20.

The brakes and clutches or friction drive establishing devices are conventional and together with the hydrostatic drive units may be operated in any known way, e.g. electrically, hydraulically, pneumatically, or by some mechanical provision and according to a certain schedule. A typical operation of the power train is described in the following illustrative summary and demonstrates the several power train operating features.

OPERATION

As shown in FIG. 2 the power train may be operated to provide four drive ranges and steering in each drive range. For neutral, all of the drive establishing devices are disengaged to disconnect all power paths from the output shafts. In neutral, both of the pumps 31 and 32 are conditioned for zero displacement and thus cannot deliver power to the respective motors 69 and 36.

The first and lowest drive range (1) is established by engaging both of the first drive range brakes 49 and 83 and the propulsion drive brake 116, all other drive establishing devices being disengaged. With power to the input shaft 10 and on simultaneous identical control of the displacements of the two pumps 31 and 32, the sun gears 42 and 76 in the drive establishing-power combining units 22 and 20, respectively, are driven in the same direction and at identical speeds, the speeds increasing with increasing pump displacement. With the sun gears 42 and 76 driven in one direction and the respective ring gears 48 and 82 held, the respective carriers 46 and 80 and thus the respective main shafts 47 and 81 and respective ring gears 101 and 96 of the speed differential units 26 and 24 are caused to rotate in the same direction at identical reduced speeds by the separate full hydrostatic drives. Since the propulsion drive brake 116 is engaged, the respective sun gears 104 and 100 of the speed differential units 26 and 24 are positively held to provide reaction and thus the respective carriers 103 and 99 of units 26 and 24 and respectively connected output shafts 14 and 12 are driven in the same direction at identical further reduced speeds.

In the first drive range, steering is provided by differential control of the hydrostatic drive units 16 and 18 to establish a speed differential between the two output shafts 12 and 14 to effect turning of the vehicle in the desired direction. This speed differential may be effected by increasing or decreasing the speed of one of the hydrostatic output drives, or decreasing the speed of one of these drives while increasing the speed of the other drive.

In the first drive range, the sun gear 41 and ring gear 52 in the left drive establishing-power combining unit 22 and the corresponding sun gear 74 and ring gear 88 in the right drive establishing-power combining unit 20 are being driven in the same direction and these two driving members of the respective gear sets 43 and 77 cooperatively produce drive to the respective carriers 51 and 86 and thus drive through the respective gear trains 58, 56 and 91, 90 to the driven clutch member of the respective second drive range clutches 54 and 89. These arrangements enable the gear sizes to be selected so that at a predetermined output speed of the motors 36 and 69, preferably maximum motor speed which occurs at maximum pump displacement, the driven clutch member is rotated in the same direction and at the same speed as the driving clutch member in the second drive range clutches 54 and 89.

The shift from first to the second drive range (2) is preferably accomplished when the above speed synchronized condition of both the second drive range clutches 54 and 89 is reached. The first drive range brakes 49 and 83 are then released and both of the second drive range clutches 54 and 89 are engaged with the propulsion drive brake 116 remaining engaged to maintain reaction at the sun gears 104 and 100 in the speed differential units. Since the sun gears 41 and 74 are rotating in the same direction as the respective carriers 51 and 86, the speed component of the sun gears subtracts from that of the carriers in the drive to the respective ring gears 52 and 88 and thus the drive to the respective main shafts 47 and 81 and the respective output shafts 14 and 12. Thus the speed of ring gears 52 and 88 and the respective output shafts 14 and 12 increase with decreasing speed of the respective sun gears 41 and 74 until the latter gears reach zero speed. Then when the sun gears 41 and 74 are rotated in the opposite direction, their speed component adds to that of the respective carriers 51 and 86 so that the speed of the output shafts 14 and 12 then increases with increasing speed of the respective sun gears 41 and 74 in this opposite direction. Thus, in the second drive range the displacement of pumps 32 and 31 is initially decreased from maximum displacement to decrease the speed of sun gears 41 and 74 and thus increase the speed of the respective output shafts 14 and 12 until zero displacement and thus zero speed of the sun gears is reached. Then the speed of the output shafts 14 and 12 is increased by increasing the displacement of the pumps in the opposite sense to increase the speed of the sun gears 41 and 74 in the opposite direction with maximum output speed of the motors being reached when maximum displacement of the pumps is reached. The drive establishing-power combining units 22 and 20 in the second drive range thus combine the mechanical drive from the input shaft 10 to the carriers 51 and 86 with the hydrostatic drive to the respective sun gears 41 and 74 to provide separate hydromechanical drives to the respective main shafts 47 and 81 for driving the respective output shafts 14 and 12. Downshifting from second to the first drive range is also provided with a speed synchronized condition at the first drive range brakes 49 and 83 by the drive to the respective ring gears 48 and 82 which conditions these gears at zero speed at the initial maximum motor speed in the second drive range. Steering is provided in the second drive range in the same manner as in the first drive range previously described.

To illustrate one of the advantages of my power train, it will be assumed that the left hydrostatic drive unit 18 can accept the full drive load of this vehicle in the middle of the second drive range (2). I will now show how the hydrostatic drive unit 18 can then transmit all of the power for propulsion drive to relieve the other hydrostatic drive unit 16 of constant drive duty and thus reduce operating losses in the latter unit and thereby increase the efficiency of the power train. This is accomplished by shifting from the second drive range (2) to an alternate second drive rang (2 ALT.) at zero speed of the motors 36 and 69 which occurs at the mid point in the second drive range. The alternate second drive range (2 ALT.) is established by maintaining engagement of the left second drive range clutch 54, releasing both the right second drive range clutch 89 and the propulsion drive brake 116 and engaging both the propulsion drive clutch 120 and steer clutch 119. Since the gear train 106 is not rotating and the output speed of motor 69 is zero, the steer clutch 119 is speed synchronized (neither of the engageable clutch members are rotating) for its engagement. Since the pump 31 is at zero displacement, the motor 69 is hydraulically locked and by the engagement of steer clutch 119 the sun gears 100 and 104 of the speed differential units are thus positively held for reaction like when the propulsion drive brake 116 was engaged. With the propulsion drive clutch 120 engaged the right main shaft 81 receives the same drive as the left main shaft 47 from the left drive establishing-power combining unit 22 and thus the output shafts 12 and 14 are powered through a common power path in that they are both driven by the hydromechanical drive from the left unit 22. The drive to the right main shaft 81 from the left unit 22 is identical to that previously received from the right unit 20 in the second drive range and thus operation of the left hydrostatic drive unit 18 identical to that previously described for the second drive range produces the same output speed control in the alternate second drive range but now the speed of the right output shaft 12 is additionally controlled thereby.

Steering in the alternate second drive range is provided by conditioning the right hydrostatic drive unit 16 to drive the differential shaft 111, this unit's output not being effective to produce drive to the main shaft 81 of the right unit 22 since neither the right first drive range brake 83 nor the right second drive range clutch 89 is engaged. The right hydrostatic drive unit 16 is conditioned to produce this steer drive by increasing the displacement of pump 31 from zero. With the motor 69 thus powered to drive the differential shaft 111, the sun gears 100 and 104 of the speed differential units are driven in opposite directions at the same speed and act to increase the speed of one output shaft and decrease the speed of the other output shaft by the same amount. For example, when the sun gear 100 in the right speed differential unit 24 is driven in the same direction as the ring gear 96 in this unit while the sun gear 104 in the left speed differential unit 26 is driven in a direction opposite that of ring gear 101 in this latter unit, the speed component of sun gear 100 is additive to that of ring gear 96 while the speed component of sun gear 104 subtracts from that of ring gear 101. This increases the speed of the right output shaft 12 while decreasing the speed of the left output shaft 14 by the same amount to produce a turn in one direction. Alternatively, a turn in the opposite direction is effected by increasing the displacement of pump 31 in the opposite sense to drive the differential shaft 111 in the opposite direction.

In the last half of both of the second drive ranges (2, 2 ALT.) the sun gear 42 is driven in a direction opposite that of carrier 46 in gear set 44 of the left drive establishing-power combining unit 22. These two drives combine to drive the ring gear 48 of this gear set in the same direction as carrier 46, and thus produce a drive through gears 61 and 60 to the driven clutch member of the third drive range clutch 59. This arrangement enables the gear sizes to be selected so that at the maximum speed of motor 36, the driven clutch member is rotating in the same direction and at the same speed as the driving clutch member of the third drive range clutch 59.

The shift from either of the second drive ranges to the third drive range (3) is preferably accomplished when the above speed synchronized condition of the third drive range clutch 59 is reached. The third drive range is established by engagement of the third drive range clutch 59, the propulsion drive clutch 120 and the steer clutch 119, all other drive establishing devices being disengaged. The pump 31 of the right hydrostatic drive unit 16 is conditioned for zero displacement to lock the motor 69 and thus positively hold the sun gears 100 and 104 of the speed differential units for reaction like in the alternate second drive range. Mechanical drive is delivered through the engaged third drive range clutch 59 to drive ring gear 48 of gear set 44 in a direction opposite that of sun gear 42 of this gear set which sun gear is being driven by the motor 36. Since the sun gear 42 is rotating in a direction opposite that of ring gear 48, the speed component of sun gear 42 subtracts from that of ring gear 48 in the drive to carrier 46 which is connected by the engaged propulsion drive clutch 120 to drive the right main shaft 81 and thus the right output shaft 12 in addition to driving the left main shaft 47 and thus the left output shaft 14. Thus, the speed of carrier 46 and both output shafts 12 and 14 increases with decreasing speed of sun gear 42 until the latter gear reaches zero speed. Then when sun gear 42 is rotated in the opposite direction its speed component adds to that of ring gear 48 so the speed of carrier 46 and thus the output shafts 12 and 14 then increases with increasing speed of sun gear 42 in this opposite direction. Thus, in the third drive range the displacement of pump 32 is decreased from its maximum to zero to increase the speed of the output shafts and is then increased to maximum displacement of the opposite sense to continue increasing the speed of carrier 46 and the speed of output shafts 12 and 14. The left drive establishing-power combining unit 22 thus combines the mechanical power path from the input shaft 10 through the third drive range clutch 59 with the hydrostatic power path through the left hydrostatic drive unit 18 to provide another hydromechanical drive of higher speed ratio to drive the output shafts. Downshifting from third to either of the second drive ranges is also provided with a speed synchronized condition in the left second drive range clutch 54 by the drive to carrier 51, this condition occurring at initial maximum speed of motor 36 in the third drive range.

Steering in the third drive range is provided in the same manner as previously described in the alternate second drive range. Thus, the right hydrostatic drive unit 16 is used only for steering operation in the third drive range.

In the last half of the third drive range the sun gear 41 and ring gear 52 of gear set 43 in the left drive establishing-power combining unit 22 are being driven in the same direction and cooperatively produce a drive to carrier 51 and thus a drive through gears 66 and 64 to the driven member of the fourth drive range clutch 62. This arrangement enables the gear sizes to be selected so that at maximum speed of the motor 36 in the third drive range the driven clutch member is rotated in the same direction and at the same speed as the driving clutch member of the fourth drive range clutch 62.

The shift from third to the fourth drive range (4) is preferably accomplished when the above speed synchronized condition of the fourth drive range clutch 62 is reached. The third drive range clutch 59 is then released and the fourth drive range clutch 62 is engaged while the propulsion drive clutch 120 and steer clutch 119 remain engaged and the pump 31 of the right hydrostatic drive unit 16 is at zero displacement. Mechanical drive is delivered through the engaged fourth drive range clutch 62 to drive carrier 51 in the same direction as sun gear 41 which is being driven by motor 36. Since sun gear 41 is rotating in the same direction as carrier 51, the speed component of sun gear 41 subtracts from that of carrier 51 in the drive to the ring gear 52 and thus the drive to the output shafts 12 and 14 like in both of the second drive ranges. Thus the speed of ring gear 52 and the drivingly connected output shafts 12 and 14 increases with decreasing speed of sun gear 41 until the latter gear reaches zero speed. Then when sun gear 41 is rotated in the opposite direction, its speed component adds to that of carrier 51 so that the speed of ring gear 52 and thus output shafts 12 and 14 then increases with increasing speed of sun gear 41 in this opposite direction. Thus, in the fourth drive range the displacement of pump 32 is decreased from its maximum to zero and is then increased to maximum displacement of opposite sense to continuously increase the speed of output shafts 12 and 14. The left drive establishing-power combining unit 22 thus combines the mechanical power path from the input shaft 10 through the fourth drive range clutch 62 with the hydrostatic power path through the hydrostatic drive unit 18 to provide another hydromechanical drive of higher speed ratio to drive the output shafts. Downshifting from fourth to the third drive range is also provided with a speed synchronized condition in the third drive range clutch 59 by the drive to the ring gear 48, this condition occurring at initial maximum speed of motor 36 in the fourth drive range.

Steering in the fourth drive range is provided in the same manner as in the alternate second drive range and the third drive range. Thus, the right hydrostatic drive unit 16 is used only for steering in the fourth drive range.

Thus, my power train relieves one of the hydrostatic drive units of constant drive duty when the output speed corresponding to a particular vehicle speed reaches a value where one of the hydrostatic drive units can provide sufficient torque for propulsion. It will also be understood that this could occur in the first drive range, i.e. at lower output speed, in which event the power train is also operational to provide an alternate first drive range similar to the alternate second drive range but with the common power path to the two output shafts then having full hydrostatic drive instead of hydromechanical drive.

The above described preferred embodiment is illustrative of the invention which may be modified within the scope of the appended claims.

We claim:
1. In a power train the combination of an input shaft; a pair of output shafts; separate drive train means for separately drivingly connecting said input shaft to said output shafts; each said drive train means comprising variable ratio hydrostatic drive means, drive establishing-power combining means and speed differential means; each said variable ratio hydrostatic drive means connected to be driven by said input shaft; each said drive establishing-power combining means connected to be selectively driven singularly by the associated variable ratio hydrostatic drive means to provide hydrostatic drive and simultaneously by the associated variable ratio hydrostatic drive means and said input shaft to provide hydromechanical drive; each said speed differential means connected to drive the associated output shaft; reaction-steer means operatively connecting both said speed differential means for selectively providing reaction in both said speed differential means and a drive connection between said speed differential means; each said drive establishing-power combining means operatively connected to provide its hydrostatic and hydromechanical drives to the associated speed differential means to effect in cooperation with the reaction afforded by said reaction-steer affording means a propulsion-steer drive to the associated output shaft; drive transmitting means for selectively transmitting the hydrostatic and hydromechanical drives in one of said drive train means to the speed differential means in the other drive train means to effect in cooperation with the hydrostatic and hydromechanical drives to said speed differential means in said one drive train means and the reaction afforded by said reaction-steer means a propulsion drive to both said output shafts; and steer drive means including said drive connection for selectively operatively connecting the hydrostatic drive means in said other drive train means to provide steer drive to both said speed differential means to effect in cooperation with said one drive train means and said drive transmitting means a propulsion-differential steer drive to said output shafts.

2. The power train set forth in claim 1 and said one drive train means including a plurality of mechanical drive means for selectively establishing mechanical drive connections between said input shaft and the drive establishing-power combining means in said one drive train means to provide a plurality of hydromechanical drives from the last mentioned drive establishing-power combining means.

3. The power train set forth in claim 1 and each said drive establishing-power combining means comprising a pair of planetary gear sets, one of said gear sets having an input member, a reaction member and an output member, the other of said gear sets having a pair of input members and an output member, both of said output members connected to provide drive to the associated speed differential means, the input member of said one gear set and one input member of the other gear set connected to be driven by the associated variable ratio hydrostatic drive means, a brake for braking said reaction member, mechanical drive means including a clutch for selectively drivingly connecting said input shaft to the other input member of said other gear set.

4. The power train set forth in claim 3 and said reaction-steer means including a brake for braking said drive connection to effect reaction in both said speed differential means, said drive transmitting means including a clutch for clutching both said output members in said one drive train means to the speed differential means in said other drive train means, said steer drive means including a clutch for clutching the variable ratio hydrostatic drive means in said other drive train means to both said speed differential means.

5. The power train set forth in claim 3 and mechanical drive means including a clutch for selectively drivingly connecting said input shaft to said reaction member in said one drive train means, mechanical drive means including a clutch for selectively drivingly connecting said input shaft to said other input member of said other gear set in said one drive train means with a speed ratio drive different from that provided by the other selective drive from said input shaft to this input member.

References Cited

UNITED STATES PATENTS

| 3,107,554 | 10/1963 | Polak et al. | 74—720.5 |
| 3,199,376 | 8/1965 | De Lalio | 74—720.5 |
| 3,383,953 | 5/1968 | Christenson | 74—720.5 |
| 3,398,605 | 8/1968 | Ainsworth et al. | 74—720.5 |

ARTHUR T. McKEON, Primary Examiner